May 16, 1939. F. H. NETTER 2,158,906
DEMONSTRATION APPARATUS
Filed Dec. 7, 1938 2 Sheets-Sheet 1
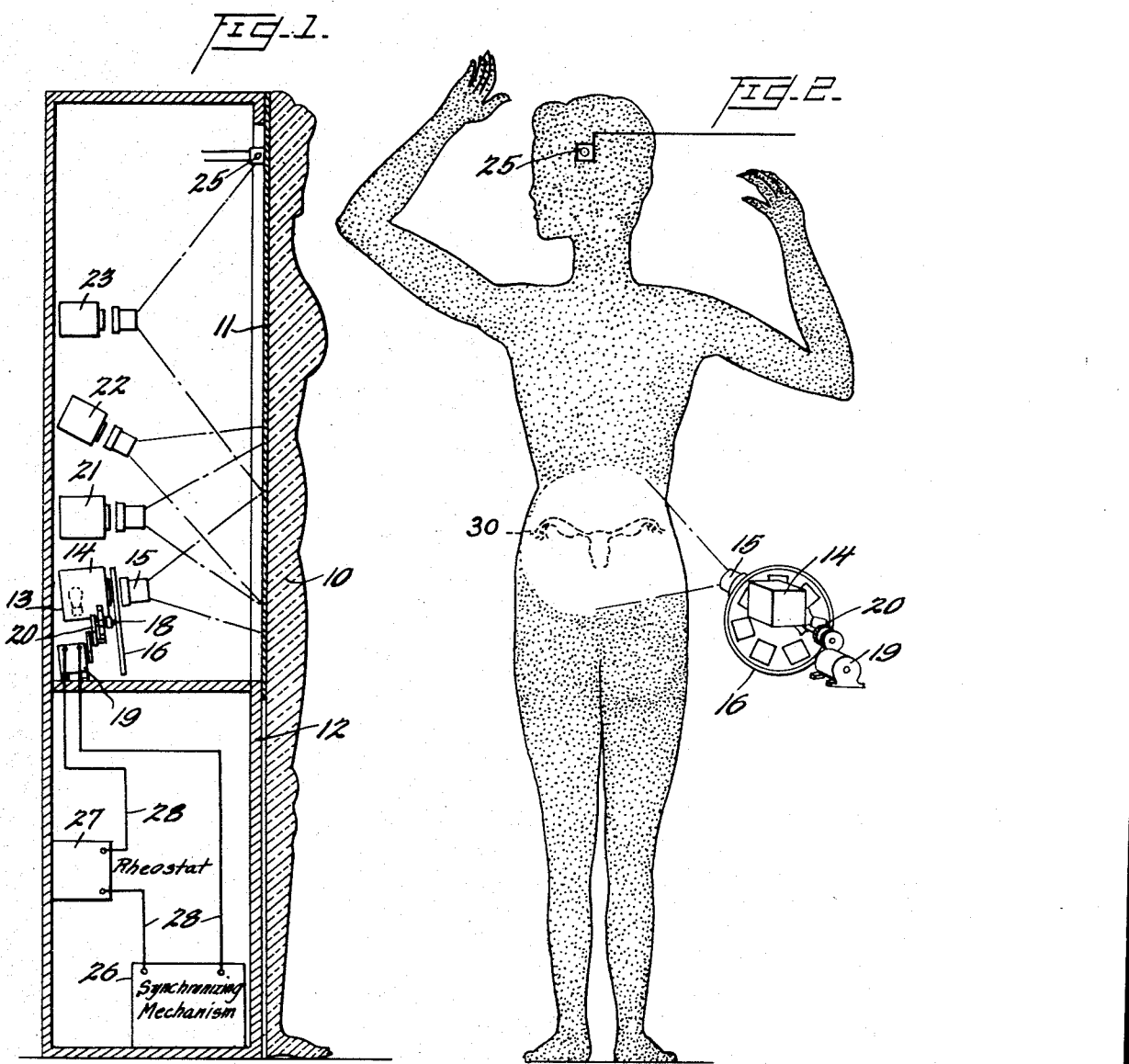

May 16, 1939.  F. H. NETTER  2,158,906
DEMONSTRATION APPARATUS
Filed Dec. 7, 1938   2 Sheets-Sheet 2
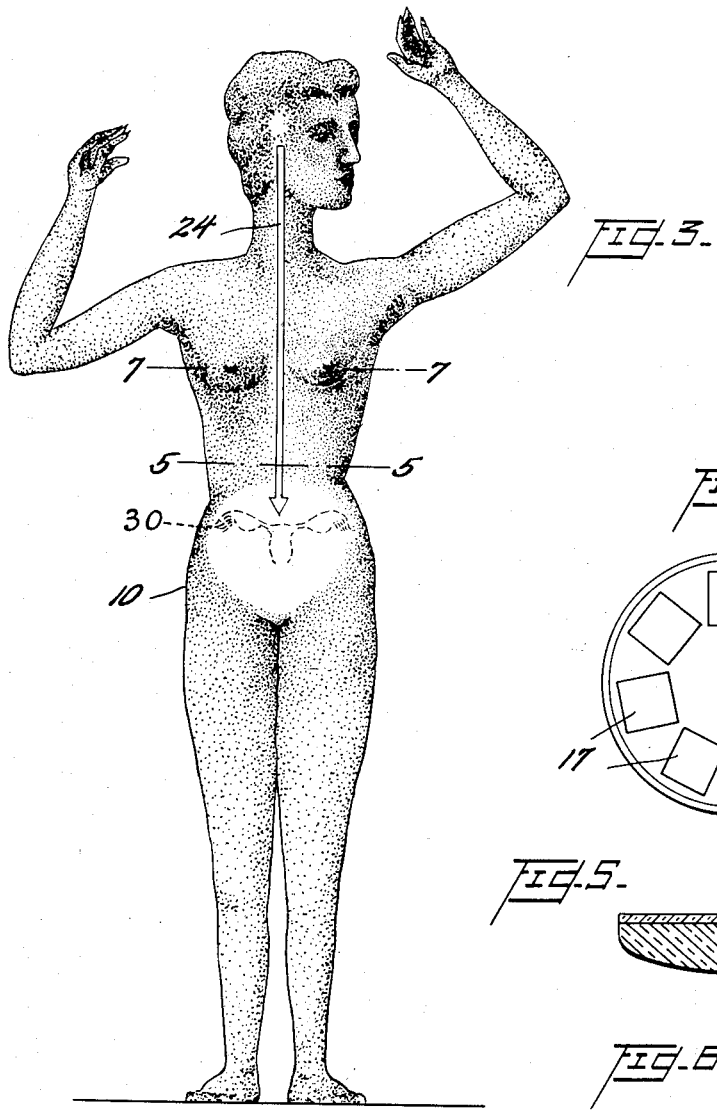
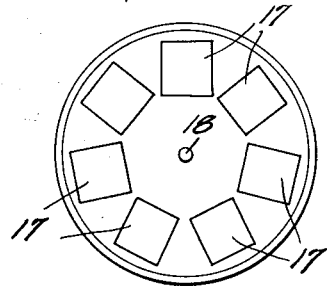
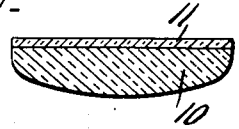
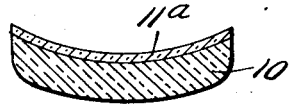
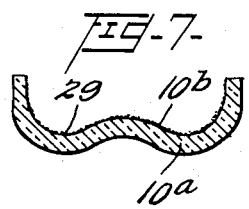
Inventor
Frank H. Netter,
By Ivan P. Tashof,
Attorney Patented May 16, 1939

2,158,906

UNITED STATES PATENT OFFICE 2,158,906

DEMONSTRATION APPARATUS

Frank H. Netter, New York, N. Y.

Application December 7, 1938, Serial No. 244,471

9 Claims. (Cl. 35—17)

This invention relates to physiological demonstration apparatus and has special reference to a demonstration device for displaying various anatomical organs and their functions in such manner as to render the positions and functions of such organs clearly apparent.

More particularly the invention relates to a physiological demonstration apparatus peculiarly adapted for use in connection with a simulation of a body such as that of a human being.

One important object of the invention is to provide novel apparatus of this character so constructed as to make it possible to demonstrate various physiological processes as they occur within an organism, the device thus being valuable in the teaching of anatomy, physiology and other kindred sciences and arts. With this object in view, it can be understood that a device of this character would be very advantageous in the education of the lay public in subjects pertaining to health and the like.

A second important object of the invention is to provide a novel physiological demonstrative apparatus adapted to optically display the relation of the endocrine glands to the functions of the organs controlled or regulated by such glands.

A third important object of the invention is to provide a novel physiological demonstration apparatus capable of utilization to visually display steps in the action of and processes accomplished by various organs of the body.

A fourth important object of the invention is to provide a projection system including a novel screen capable of portraying on a body representing a physical structure, a series of actions which appear to take place either within or upon the surface of the said body.

Still another object of the invention contemplates the provision of a novel apparatus for portraying various internal or external physiological movements.

With the above and other objects in view, the invention consists in general, of certain novel details of construction and combinations of parts hereinafter fully described, illustrated in the accompanying drawings and particularly pointed out in the appended claims.

In the accompanying drawings, like characters of reference indicate like parts in the several views, and:

Figure 1 is a vertical median section through an apparatus constructed in accordance with this invention and in a form adapted to display the human anatomy.

Figure 2 is a schematic rear view of a portion of the apparatus used in connection with this invention.

Figure 3 is a front view of such an apparatus.

Figure 4 is a detail face view of a carrier for projection slides.

Figure 5 is a detail section on the line 5—5 of Figure 3.

Figure 6 is a view similar to Figure 5, but showing a somewhat modified form of the invention.

Figure 7 is a section, of a further modified form, on the line 7—7 of Figure 3.

In the form of the invention disclosed in the present drawings there is provided a model 10 showing the forward half of a human figure. Although the figure is shown as a solid figure it is to be understood that this figure may be solid or hollow. In a great many instances, it will be desirable to make the figure hollow in order that it might be light or in order that it may possess certain other advantages to be hereinafter set forth. This figure or model 10 is preferably formed of some transparent material such as transparent plastic acrylic resin or other suitable substance having great clarity and excellent light transmission properties and which is also tough and chemically stable. Among the other materials which may be used are the various types of resins and natural and synthetic substances which are transparent, as for example, cellulose acetate, nitrate and the like. Glass may be used, but in a great many instances, due to its brittleness, would probably be somewhat impractical. The back of the figure has placed thereagainst a translucent screen such as the screen 11 of Figures 1 and 5, or the screen 11a of Figure 6. In Figure 7, the body 10a is provided with a rear surface 11b of screen material. The screen may be made of opal glass, of a translucent acrylic resin or any other substance which will serve as a projection screen suitable to receive projected images from the rear. To the rear of this screen is a housing 12 wherein is mounted one or more projection machines designed and positioned for projection of images, as, for example, those indicated at 30 in Figs. 2 and 3, on desired portions of the body. For instance, a projection machine 13 may be placed to project images on that portion of the screen behind the abdomen. The projection machine 13, preferably includes a lamp housing 14 and a lens tube 15. The lens tube is spaced from the lamp housing in order to provide for the insertion therebetween of a circular slide carrier 16, supporting a series of circularly spaced transparent slides 17. It is to be understood that the slide carrier is movable.

The slides 17 may show successive steps in a physiological process such as steps in the growth of a human foetus. This carrier is preferably supported on a shaft 18 driven from a motor 19 through a reduction gear and Geneva movement as indicated in general at 20, so that the slides 17 may be brought by a step-by-step movement into position for projection.

Other projection machines, indicated in general at 21, 22 and 23, may be used to project other organs or may be arranged to throw overlapping images to illustrate correlative physiological changes or to project other desired images. For instance, one or more of such projecting machines may be used to project an image such as the arrow 24, or to illuminate an arrow or the like depicted on the screen. Also a lamp 25 may be placed at the location of a gland such as the pituitary gland and the arrow 24 may be shown as extending from such gland to the organ whose functions are controlled, regulated or otherwise affected by such gland.

In place of the projected arrow, it may be at times desirable to portray an arrow by some other means. This may be done by directly illuminating a shadow-box in the shape of an arrow or by constructing an arrow of some transparent substance either in front of or behind the screen and then directly illuminating this arrow by means of neon or some other form of electrical lighting. It may be further understood that where one or more projection machines are used to throw images on the translucent screen that one image may be made to appear within the other or to surround the other image by a suitable adjustment of focus.

The motor 19 may be associated with the synchronizing mechanism, indicated at 26, and with a rheostat 27 by conductors 28, the synchronizing mechanism being used to synchronize the display of the slides with a suitable talking machine so that the display of the slides may be accompanied by a lecture or other description of the organs, physiological actions or changes or any other desirable explanation of the visual display. The purpose of the rheostat 27 is to enable the image to be dimmed when one slide is being substituted by the other slide. In other words, by the use of the rheostat, successive images thrown on the screen 11 may be made to fade out and blend one into the other. It may be also desirable to provide a movable shutter in front of one or more of the projectors to enable the projection field or image produced by the particular projector to be enlarged or diminished at will. This shutter may be automatically operated and synchronized with the successive images or may be manually operated.

When viewed from in front, this figure will give the observer an impression as though he were actually looking through the figure and seeing the organs in coordinated action. Thus for example, the pituitary gland would light up. Next the arrow leading from the pituitary gland to the ovary would light up indicating the relationship between the two. A succession of changes in the ovary and uterus could then be portrayed by projection of pictures from projectors 13, 21 and 22, indicating the uterine cycle, the appearance of a baby within the womb. Any other organs or structures might be similarly portrayed, either static or in action.

A modification of this device may be constructed without the use of the separate translucent screen, as in Figure 7. In that event, the figure itself is made translucent rather than transparent so that it will be practical to project directly upon its internal surface. If this method is resorted to it may be necessary to prepare the drawings for the slides in such a manner as to compensate for any slight distortion resulting from the curvature of the body surface. Even if the separate projection screen is employed it may enhance the semblance of reality if this screen is given a slight curvature or modeling as in Figure 6, to conform somewhat to the shape of the organs projected upon it. If the figure is made of an acrylic resin, it may be made suitable to directly receive the projection by sandblasting its surface as at 29 in Figure 7. This will render it translucent rather than transparent.

If desired, the figure may be tinted with transparent paint to further enhance the semblance of reality. It is also possible to use opaque paints over parts of the body where no projection is to be made and transparent paint or no paint over the parts through which the images are to be seen.

It is to be noted, after a figure is tinted, it may be desirable to adjust the colors of the projection slide to compensate for any color deviations resulting from this color effect.

It is not necessary in all instances to construct an entire body of transparent material. The principles outlined above may be applied to a transparent or translucent model of a part of the body as the head, torso, etc. Likewise, these same principles may be applied to a translucent or transparent model of a single internal organ or group of organs, as the heart, lungs, etc. If for example, it is desired to show the progress of tuberculosis through a lung, a transparent or translucent model of a lung may be prepared, and then by projection from behind or within the lung, the area involved in the tuberculous injection may be demonstrated. By simply changing the slides either manually or mechanically, any change, either qualitative or quantitative in the diseased area of the lung may be demonstrated.

If it is desired to show a continuous change within an organ or within the body, a motion picture projector may be substituted for one or more of the projection machines.

It is also possible by means of this device to project subtitles within the transparent model so as to explain the action which is seen to take place or to name or describe the various organs.

This device may be employed in conjunction with other methods of anatomical demonstration. For example, a transparent model of a human or animal figure can be constructed. Within this figure there may be placed models of the various organs in their relative anatomical positions, or these organs may be painted on a screen or in some other way indicated. It may not be feasible, however, to demonstrate certain organs or disease conditions by any of these simple methods and in that event, the hereindescribed projection principle may be employed to portray those particular organs or disease conditions.

Diseases of the skin may be ideally demonstrated by this projection device. For the demonstration of these conditions it is preferable to project directly on the inside of a translucent model rather than on a screen within the model. A modification particularly suitable for such projection is disclosed in Figure 7. The present invention makes it possible to project actual photographs of the skin conditions on the surface of the figure so as to very closely simulate reality.

This device may be constructed so as to apply to other than purely animal forms. It may be made to demonstrate action, changes, or mechanical relationships within some mechanical contrivance. For example, if it is desired to demonstrate the action of an engine within an automobile, a model of an automobile may be constructed of a transparent material and the changes in the engine demonstrated by projection upon a screen within or behind the model. The model could also be made translucent and the projection made directly upon its internal surface.

It is to be understood that where the word "transparent" is used in the specification and claims, what is meant is, such a degree of transparency that an image projected or otherwise portrayed upon the rear of a model, in accordance with the present invention, will be visible through the model by an observer as stationed on the side remote from the image. It is to be understood that where the term "image" is used in the claims what is meant is "an imitation, representation or similitude of any person or thing, sculptured, drawn, painted or otherwise made perceptible to the sight." This definition appears on page 1243 of Webster's New International Dictionary, published by G. & C. Merriam Company, Springfield, Massachusetts, 1939, and of course includes the use of a transparency or any other suitable visual representation which may be suitably mounted behind the semi-transparent portion of the model and made visible by light so as to appear within or integral with the model.

It may be further noted that although in the specific embodiment disclosed herein, a sectional figure is shown corresponding to half of a physical structure or body, that it is within the province of the present invention to utilize a physical or body structure corresponding to an entire body or any part thereof. The projection screen cooperating with the body and/or the transparent portion thereof, could be placed either within the body if it is sufficiently transparent or behind the body. It is understood that the body may not necessarily be entirely transparent but need only be of such a degree of transparency that the screen and the image thereon may be visible to the observer from a desired position.

Although it is preferred to project the image from the rear of the body, as in most instances this would give an impression of reality, it is understood that projection in some instances could be made from the front or observer's side of the transparent body as is done in the usual motion picture theatre.

In the event that the figure is to be placed in such a position that there is insufficient room to the rear of the same for a suitable projector, the projection machine may be placed to one side thereof and mirrors used to suitably angulate and project the image upon the screen.

In the specific embodiment of the invention, a rotatable slide change device is described. It is desired to particularly point out that the slides may be changed by any suitable device, or manually. For example, these slides may be arranged upon a moving chain or conveyor. In some instances, it may be desirable to place a number of different pictures upon a single slide and by suitable focusing of the light through the different parts of the slide, cause different images to be projected. This operation may be under the control of the operator or lecturer so as to project these different images at will. It may also be desirable, in some instances, to utilize a slide upon which a number of different organs in the various parts of the body are depicted. By moving the projector a sufficient distance from the screen, all of the organs could be projected at once upon the anatomical figure and then by either manually or mechanically controlled means, a suitable mask shifted to project only one or any desired combination of the various organs upon the anatomical figure at will. It is of course obvious that the apparatus according to the present invention could be utilized to demonstrate plant phenomena and other analogous phenomena as well as animal and mechanical processes.

Further, in utilizing the apparatus for teaching the function of various anatomical structures, it may at times be desirable to distort these anatomical structures or to replace them by some symbolic structure.

In teaching the function of the brain, for example, it may be desirable to project a picture of a switchboard upon the screen of the device in such fashion that the switchboard will appear positioned in place of the brain in order to bring out the comparison between the functioning of the brain and the operation of a telephone switchboard. In some instances, for entertainment purposes, unusual and fictitious structures may be shown as positioned within the body, as for example, a pumpkin growing in the head or some operation going on within the abdomen to represent a stomach-ache or the like.

In other words the device as a whole can be made to function in any desired manner in order to portray optically various operations as occurring within a structure whether these operations be highly imaginative or posses some semblance of reality.

What is claimed is:

1. A display device, including a three-dimensional member of sufficient thickness to present the illusion of solidity and substantially conforming in shape and general appearance to at least a portion of a three-dimensional physical structure, and having at least a portion thereof of limited transparency, and means to produce an illuminated image on the side of said member adjacent said transparent portion, and remote from an observer, so that said image appears to be integral with said member.

2. A display device, including a three-dimensional member of sufficient thickness to present the illusion of solidity and substantially conforming in shape and general appearance to at least a portion of a three-dimensional physical structure, and having at least a portion thereof transparent, said member having a projection-receiving surface of limited transparency on one side thereof adjacent said transparent portion, and means to project an image on said surface from a point remote from an observer, so that said image appears to be integral with said member.

3. A display device, including a three-dimensional member of sufficient thickness to present the illusion of solidity and substantially conforming in shape and general appearance to at least a portion of a three-dimensional physical structure, and having at least a portion thereof transparent, said member having a projection-receiving surface of limited transparency on one side thereof adjacent said transparent portion, said projection-receiving surface being substantially parallel and conforming in shape to the outer surface of the member, and means to project an image on said surface from a point remote from an observer, so that said image appears to be integral with said member.

4. A display device, including a three-dimensional member of sufficient thickness to present the illusion of solidity and substantially conforming in shape and general appearance to a translateral section through a human body in the round, and having at least a portion thereof of limited transparency, and means to produce an illuminated image on the side of said member adjacent said transparent portion, and remote from an observer, so that said image appears to be integral with said member.

5. A display device, including a three-dimensional member of sufficient thickness to present the illusion of solidity and substantially conforming in shape and general appearance to a translateral section through a human body in the round, and having at least a part of the forward portion thereof transparent, a translucent projection screen forming the rear surface of said member, and projection apparatus on the side of said body remote from an observer, directed to project objects in simulation on said screen, so that said objects appear to be integral with said member, said projection apparatus including means for changing the image projected therefrom, so as to indicate successive changes within the member.

6. A display device, including a three-dimensional member of sufficient thickness to present the illusion of solidity and substantially conforming in shape and general appearance to at least a portion of a three-dimensional physical structure and having at least a portion thereof of limited transparency, and means to produce an illuminated image on the side of said member adjacent said transparent portion, and remote from an observer so that said image appears to be integral with said member, an additional illuminated means within said member and associated with the image to demonstrate anatomical phenomena and means indicating the association of the illuminated means with the image.

7. A display device, including a three-dimensional member of sufficient thickness to present the illusion of solidity and substantially conforming in shape and general appearance to at least a portion of a three-dimensional physical structure, and having at least a portion thereof transparent, said member having a roughened surface forming a projection-receiving screen of limited transparency on one side thereof adjacent said transparent portion, and means to project an image on said surface from a point remote from an observer so that said image appears to be integral with said member.

8. A display device, including a three-dimensional member of sufficient thickness to present the illusion of solidity and substantially conforming in shape and general physical structure, and having at least a portion thereof transparent, said member having a projection-receiving surface of limited transparency on one side thereof adjacent said transparent portion, means to project an image on said surface from a point remote from an observer, so that said image appears to be integral with said member, and a synchronizing mechanism associated with said projection means for synchronizing the action of said projection means with a voice reproducing device.

9. A display device, including a three-dimensional member of sufficient thickness to present the illusion of solidity and substantially conforming in shape and general appearance to at least a portion of a three-dimensional physical structure, and having at least a portion thereof transparent, said member having a curvilinear projection-receiving surface of limited transparency on one side thereof adjacent said transparent portion, and means to project an image on said surface from a point remote from an observer, so that said image appears to be integral with said member.

FRANK H. NETTER.